United States Patent
Itoh et al.

(10) Patent No.: US 9,567,694 B2
(45) Date of Patent: Feb. 14, 2017

(54) ELASTIC FABRIC COMPRISING A POLYURETHANE ELASTIC FIBER MADE FROM A POLYETHER BASED POLYOL

(75) Inventors: Shingo Itoh, Shiga (JP); Toshihiro Tanaka, Shiga (JP); Hong Liu, Waynesboro, VA (US)

(73) Assignee: Toray Opelontex Co., Ltd., Tokyo (JP)

( * ) Notice: Subject to any disclaimer, the term of this patent is extended or adjusted under 35 U.S.C. 154(b) by 12 days.

(21) Appl. No.: 14/119,985

(22) PCT Filed: May 24, 2012

(86) PCT No.: PCT/US2012/039306
§ 371 (c)(1),
(2), (4) Date: Nov. 25, 2013

(87) PCT Pub. No.: WO2012/166504
PCT Pub. Date: Dec. 6, 2012

(65) Prior Publication Data
US 2014/0087170 A1  Mar. 27, 2014

(30) Foreign Application Priority Data

May 27, 2011 (JP) ................................ 2011-118834
May 18, 2012 (JP) ................................ 2012/114192

(51) Int. Cl.
*D01F 6/70* (2006.01)
*D03D 15/08* (2006.01)
*D04B 1/18* (2006.01)

(52) U.S. Cl.
CPC ............... *D01F 6/70* (2013.01); *D03D 15/08* (2013.01); *D04B 1/18* (2013.01); *Y10T 428/249921* (2015.04)

(58) Field of Classification Search
CPC ............ D01F 6/70; D03D 15/08; D04B 1/18; Y10T 128/249921
USPC ........................................ 428/364, 365, 221
See application file for complete search history.

(56) References Cited

U.S. PATENT DOCUMENTS

| 6,197,915 B1 * | 3/2001 | Yamana ............ C08G 18/0895 264/176.1 |
| 6,391,953 B1 * | 5/2002 | Hutte et al. ................... 524/173 |
| 7,812,075 B2 * | 10/2010 | Hong ............................. 524/25 |

FOREIGN PATENT DOCUMENTS

| JP | 06-86683 A | 3/1994 |
| JP | 09-59821 A | 3/1997 |
| JP | 2968049 B2 | 10/1999 |
| JP | 2005154994 A | 6/2005 |
| JP | 2009235658 A | 10/2009 |
| JP | 4632351 B2 | 2/2011 |
| KR | 10-1998-0016620 A | 6/1998 |

OTHER PUBLICATIONS

International Search Report and Written Opinion Received for PCT Application No. PCT/US2012/039306, mailed on Aug. 12, 2013, 9 pages.
International Preliminary Report and Patentability Report Received for PCT Patent Application No. PCT/US2012/039306, mailed on Dec. 12, 2013, 7 pages.
S, Siggia, "Quantitative Organic Analysis via Functional Group S", 3rd Edition, Wiley & Sons, New York, 1963, pp. 559-561.

* cited by examiner

*Primary Examiner* — Arti Singh-Pandey
(74) *Attorney, Agent, or Firm* — Bridget C. Sciamanna

(57) ABSTRACT

To provide elastic fabric that has comfortable wear and fit even in thin and light fabric by using a high-powered polyurethane elastic fiber that has at least 1.5 times the active force and recovery per unit fineness at the time of 100 to 200% elongation compared to conventional polyurethane elastic fiber. Resolution means an elastic fabric comprising a polyurethane elastic fiber made of a polyol, with a molecular weight between 450 and 1600 with a ratio of weight average molecular weight to number average molecular weight of at least 1.8, an organic diisocyanate compound, and a diamine compound.

9 Claims, No Drawings

ELASTIC FABRIC COMPRISING A POLYURETHANE ELASTIC FIBER MADE FROM A POLYETHER BASED POLYOL

TECHNICAL FIELD

The present invention relates to elastic fabric, and more particularly relates to elastic fabric that uses high powered polyurethane elastic yarn that can achieve a comfortable fit even in a thin and light fabric compared to conventional elastic fabric containing polyurethane elastic fiber.

RELATED TECHNOLOGY

Elastic fiber is widely used on account of its excellent stretch and recovery properties for use in stretchable clothing such as leg warmers, inner-wear, and sportswear, use in sanitary products such as disposable diapers and sanitary napkins, as well as use in industrial materials.

Recently uses for polyurethane elastic fiber has widely grown from among other elastic fibers for its very high tenacity, high elastic recovery, excellent heat resistance, and suitable heat set ability when combined with not only synthetic fibers such as nylon yarn and polyester yarn but also natural fibers such as cotton and wool and semi synthetic fibers.

In recent years, consumers have been demanding thinner and lighter material for clothing based on needs for clothes with a softer texture that does not interfere with movement while exercising, and which provides a more comfortable fit, and in conjunction with the increase in two income families, the increasing need for close that dry quickly after washing. Microfibers have already been developed for the so-called hard yarns such as nylon and polyester and have emerged on the market. While in recent years requests for thinner polyurethane have been growing stronger under an environment of broadening use.

Meanwhile, because the same stretch and recovery properties that are available conventionally are required so as not to lose fit even when thinning the fabric, the same acting force and recovery must be maintained even if, for example, fineness is cut by half. In other words, a so-called "high-powered yarn" is demanded in polyurethane elastic fiber having a high acting force and recovery per unit of fineness in the actual use area with 100% to 200% elongation.

A multi-filament elastic yarn is proposed (Patent Document 1) as a means for increasing the acting force and recovery of elastic fiber in which the multi-filament elastic yarn is manufactured by irreversibly elongating polyurethane after melt spinning at a shore hardness of 80 to 95° and cooling then immediately afterwards winding at a speed of no less than 600 m/min. However, with this technology, a higher active force can be achieved in which the active force at the time of 100% elongation is between 0.23 to 1.46 cN/dtex compared to a 100% modulus of the conventional polyurethane elastic yarn which is about 0.05 cN/dtex. However, because this technology has a low break elongation at between 145 to 270%, it is difficult to withstand processing at the time of forming the elastic fabric and the formed elasticity in the clothing material does not sufficiently stretch but instead produces clothing that are uncomfortable and have a poor fit.

A manufacturing method for polyurethane urea has been proposed (Patent Document 2) as a means to obtain polyurethane elastic fiber having a high tensile strength, in which a prepolymer is synthesized by reacting a molar excess of organic diisocyanate compound with a polymer diol having hydroxyl groups at both ends, then using the polyurethane urea polymer solution obtained by reacting a diamine compound with the prepolymer, spin the polymer solution at a temperature range of between 90 and 130° C.; and a method which adds a specific alkylsulfate salt or sulfate compound having a hydrocarbon group with between 6 and 20 carbons (Patent Document 3). However, this document merely mentions an elasticity modulus and breaking strength at 300%, but there is no implication of increasing the active force and recovery at the time of 100 to 200% elongation for stretching at the time an actual elastic fabric is formed.

PRIOR ART DOCUMENTS

Patent Documents

Patent Document 1 Japanese Examined Patent Application H6-86683
Patent Document 2 Japanese Unexamined Patent Application H9-59821
Patent Document 3 U.S. Pat. No. 2,968,049

SUMMARY OF THE INVENTION

Problem to be Resolved by the Invention

An objective of the present invention is to provide elastic fabric that has comfortable wear and fit even in thin and light fabric by using a high-powered polyurethane elastic fiber that has at least 1.5 times the active force and recovery per unit fineness at the time of 100 to 200% elongation compared to conventional polyurethane elastic fiber.

Means for Resolving Problems

The present invention uses any of the means given hereinafter to resolve the aforementioned problem.
(1) An elastic fabric comprising a polyurethane elastic fiber made of a polyol with a minimum number average molecular weight of 450 and a maximum of 1600, an organic diisocyanate compound, and a diamine compound.
(2) The elastic fabric according to item (1), wherein the molecular weight ratio of the polyol is a minimum of 2.0. The number average molecular weight is a minimum of 1.8.
(3) The elastic fabric according to item (1) or item (2), wherein a low molecular weight polyol is blended with a high molecular weight polyol.
(4) The elastic fabric according to any of item (1) through item (3), wherein the polyol is a polyether based polyol.
(5) The elastic fabric according to any of item (1) through item (4), wherein the reaction equivalent ratio (molar ratio) of the organic diisocyanate compound to the polyol is less than 2.
(6) The elastic fabric according to any of item (1) through item (5), wherein the polyurethane elastic fiber is spun from a solution-polymerized polyurethane polymer solution by the prepolymer method.
(7) The elastic fabric according to any of item (1) through item (6), wherein the polyurethane polymer is chain extended with a diamine compound and has a terminal group concentration of 5 to 50 meq/kg of the polymer solids.
(8) The elastic fabric according to any of item (1) through item (7), wherein the number average molecular weight of the polyurethaneurea polymer is between 40000 to 150000.
(9) The elastic fabric according to any of item (1) through item (8), wherein the polyurethane elastic fiber is spun by dry spinning of the polyurethaneurea polymer solution.

(10) The fabric according to claim 1 wherein the polyurethaneurea has molar ratio (capping ratio) of a diisocyanate to a polyol of 1.3 to 1.7 and a % NCO range of the prepolymer of 2.6 to 3.8.

In one embodiment of the present invention, the fabric includes a spandex fiber prepared from a segmented polyurethaneurea. The polyurethaneurea includes:
(a) a polyol having a number average molecular weight of 450 to 1600 (this includes a polyol having a number average molecular weight of 600 to 1100);
(b) a diisocyanate such as methylene bis(phenylisocyanate) (MDI);
(c) a diamine compound such as ethylenediamine or its mixture with at least one diamine selected from the group consisting of an aliphatic diamine and an alicyclic diamine, each having 2 to 13 carbon atoms;
(d) at least one monoamine, primary or secondary, selected from the group consisting of an aliphatic amine and an alicyclic amine, each having 2 to 12 carbon atoms.

The polyurethaneurea may have a molar ratio range of a diisocyanate to a polyol from 1.2 to 1.8, including 1.3 to 1.7 and a % NCO range of the prepolymer of 2.6 to 3.8.

Polyols with two or more different repeat units may be used by blending or copolymerizing, but from the perspective of strength and recoverability, use of a polyol that blends these 2 types, PTMG and 3M-PTG, is preferred.[1] Other polyols may also be blended or copolymerized in any way as long as the properties of PTMG, 3M-PTMG, or a polyol that blends these 2 types, are not lost.
Commercially available examples of suitable polyols include Terathane® 1000 and Terathane® 650 (INVISTA of Wichita, Kans.).

Examples of polyether polyols that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred. The polyol should have a number average molecular weight of about 450 to 1600. More specifically a poly(tetramethylene ether) glycol of number average molecular weight of about 600 to about 1100 is useful. The desired number average molecular weight may be achieved with a blend or mixture of two or more glycols which may be outside the desired molecular weight range.

Next, aromatic, alicyclic, and aliphatic diisocyanate compounds can be used as the diisocyanates used in the present invention. Examples of aromatic diisocyanate compounds include, for example, diphenyl methane diisocyanate (hereinafter abbreviated as MDI), tolylene diisocyanate, 1,4-diisocyanate benzene, xylylene diisocyanate, and 2,6-naphthalene diisocyanate and the like. Examples of alicyclic and aliphatic diisocyanates include, for example, methylene bis (cyclohexyl isocyanate) (hereinafter abbreviated as H12MDI), isophorone diisocyanate, methyl cyclohexane 2,4-diisocyanate, methyl cyclohexane 2,6-diisocyanate, cyclohexane 1,4-diisocyanate, hexahydroxylylene diisocyanate, hexahydrotolylene diisocyanate, octahydro 1,5-naphthalene diisocyanate and the like.

These diisocyanates can be used individually, or two or more types can be used in combination.

An aromatic diisocyanate compound is preferably used from among these diisocyanate compounds for its excellent strength and heat resistance for elastic fibers, and use of MDI is more preferred. One or more other types of aromatic diisocyanate compounds may be blended with MDI and used. MDI may be a blend of the 2,4' and 4,4'-MDI isomer. One suitable MDI composition contains at least 90% 4,4'-MDI isomer, such as Isonate 125MDR™ from Dow Chemical, Desmodur® 44M from Bayer and Lupranate® M from BASF.

In making the polyurethaneurea for spandex, the glycol (such as PTMEG) is first reacted with MDI, optionally with a catalyst present, to form an NCO-terminated prepolymer or a "capped glycol". This reaction is typically carried out, in a form of uniformly blended mixture, with applied heat at temperatures of 60 to 95° C. for a period of 1 hour to 6 hours. The amounts of each reaction component, the weight of the glycol ($W_{glycol}$) and the weight of MDI ($W_{mdi}$), are regulated by the capping ratio (CR), which is defined as the mole ratio of MDI to glycol as shown below:

$$CR=(W_{mdi}/MW_{mdi})/(W_{glycol}/MW_{glycol})$$

where $MW_{mdi}$ is the molecular weight of MDI (250.26) and $MW_{glycol}$ is the number average molecular weight of the glycol.

The reaction equivalent ratio (molar ratio or capping ratio) of the diisocyanate compound to the polyol is preferably greater than 1 but less than 2.

A capping ratio in the range of 1.2 to 1.8 is preferred, but 1.4 or greater but less than 1.6 is more preferred. Another suitable range for the capping ratio is 1.3 to 1.7. Within this range, elastic fiber can be obtained with excellent strength and recoverability as well as excellent workability. However, when greater than 2, spinning becomes problematic as gel is generated during polymerization. Further, unstable quality occurs as portions of the gel create weak yarn. On the other hand, when less than 1.2, heat resistance worsens and stretch to break strength lowers generating quality issues.

Diamine compounds are chain extenders for the polyurethane elastic fiber of the present invention. High recoverability becomes achievable when using diamine compounds.

Examples of diamine compounds that are low molecular weight diamine compounds include ethylene-diamine, 1,2-propanediamine, 1,3-propanediamine, 2-methyl-1,5-pentanediamine, 1,5-pentanediamine, 1,2-diaminebutane, 1,3-diaminebutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methyl cyclohexane, 1,3-pentanediamine, 1,3 cyclohexane diamine, bis(4-amino phenyl)phosphine oxide, hexamethylenediamine, 1,3-cyclohexyldiamine, hexahydromethaphenilenediamine, 2-methyl pentamethylenediamine, 1,7-heptanediamine, 1,8-octanediamine, 1,9-nonanediamine, 1,10-decanediamine, 1,12-dodecanediamine, isophorone diamine, xylylenediamines, bis(4-amino phenyl) phosphine oxide and the like. One or more of these may be mixed and used. A low molecular weight diol compound such as ethylene glycol may be used together to the extent the properties are not damaged.

A diamine compound with 2 to 5 carbons is preferred for the diamine compound, and when considering elastic yarn having superior elongation and elastic recovery and so forth, the use of ethylene diamine or a diamine mixture containing at least 70 mole % of ethylenediamine is particularly preferred. In addition to these chain extenders, a triamine compound (such as diethylene triamine or the like) may be used as well to form a branched structure to the extent that the effect of the present invention is not lost.

In order to control the molecular weight of the obtained polyurethane polymer, a chain terminator is preferred to be used at the time of the chain extension reaction. The mole ratio of the chain extender in regards to the chain terminator when considering stabilizing the yarn properties after spinning is preferred to be between 10 and 20, and more preferably would be between 14 and 18.

Examples of such chain terminators that can be used include mono-alcohol compounds such as n-butanol, and monoamine compounds such as dimethylamine, diethylamine, cyclohexyl amine, and n-hexyl amine. A monoamine compound is preferred, while diethylamine is more preferred. Chain terminators are normally used by blending with chain extenders.

The polymerization method described above for the polyurethane elastic fiber polymerized from polyols, organic diisocyanate compounds, and diamine compounds, is particularly not restricted and either a melt polymerization method or a solution polymerization method may be used as well as other methods, but the solution polymerization method is more preferred. The solution polymerization method has the benefit in that less foreign matter such as gel is generated within the polyurethane.

When using the solution polymerization method, a polyurethaneurea solution can be obtained by performing polymerization using polyols, organic diisocyanate compounds, and diamine compounds and the like as raw materials within an organic solvent, for example, DMAc, DMF, DMSO, NMP, or a solution that uses these as primary components. This reaction method is also not particularly restricted, and examples include, a one-shot method in which each raw material is introduced into the solution and dissolved then heated to a suitable temperature to cause a reaction, or a prepolymer method in which a prepolymer is formed in a nonsolvent system by first reacting the polyol and the organic diisocyanate compound and afterwards dissolving the prepolymer in a solvent and reacting with the diamine compound for chain extension to synthesize polyurethaneurea. The prepolymer method is preferred.

Moreover, mixing one or two types of catalysts, such as an amine series catalyst and an organic metal catalyst, is preferred when synthesizing the polyurethane.

Examples of amine catalysts include N,N-dimethylcyclohexylamine, N,N-dimethylbenzylamine, triethyl amine, N-methylmorpholine, N-ethylmorpholine, N,N,N',N'-tetramethylethylene diamine, N,N,N',N'-tetramethyl-1,3-propanediamine, N,N,N',N'-tetramethylhexane diamine, bis-2-dimethylamineethylether, N,N,N',N'-pentamethyldiethylenetriamine, tetramethylguanidine, triethylenediamine, N,N'-dimethylpiperazine, N-methyl-N'-dimethylaminoethyl-piperazine, N-(2-dimethylaminoethyl)moropholine, 1-methylimidazole, 1,2-dimethylimidazole, N,N-dimethylaminoethanol, N,N,N'-trimethylaminoethylethanolamine, N-methyl-N'-(2-hydroxyethyl)piperazine, 2,4,6-tris(dimethylaminomethyl)phenol, N,N-dimethylaminihexanol, and triethanolamin, and the like.

Examples of organic metal catalysts include tin octanoate, dibutyltin dilaurate, iron octanoate dibutyl, and the like.

The polyurethane concentration within the obtained polyurethaneurea polymerization solution is not particularly restricted, but when considering the stretch and recovery properties of the obtained elastic yarn, the molecular weight of polyurethane and the solution viscosity, the polymer solids in the solution is preferably between 20 and 60 wt %. Between 30 and 50 wt % is more preferable, and between 35 and 45 wt % is further preferable.

The terminal group concentration in the obtained polyurethaneurea polymerization solution derived from the diamine compound of polyurethane is preferably between 5 and 50 meq/kg, and more preferably between 10 and 45 meq/kg. When the terminal group concentration becomes higher than 50 meq/kg, the molecular weight of the polymer is shortened which instead lowers the active force and recoverability. In addition, when the terminal group concentration is less than 10 meq/kg, a portion will gel with the increase in molecular weight causing inconsistent quality as areas of low strength and elasticity are generated, and this causes problems such as lowering productivity due to the difficulty in raising the concentration in consideration of solution viscosity.

Further, measurement of the terminal group concentration derived from the diamine compound of the polyurethane elastic yarn is performed as follows. DMAc is added to the polyurethane solution to make a solution of 1.77 wt % of polyurethane concentration. Next, using an automatic titrator GT-100 made by Mitsubishi chemical, potentiometric titration is performed with p-toluene sulfonic acid (0.01N) to obtain the total content (A) of the primary amine and the secondary amine. Next, salicyl aldehyde (20% isopropyl alcohol solution) is added to the similarly adjusted polyurethane solution and reacted with the primary amine, and thereafter, potentiometric titration is performed on the secondary amine with p-toluene sulfonic acid (0.01N) to obtain the secondary amine content (B). The terminal group concentration derived from the amine compound is calculated according to the following equation.

$$\text{Effective terminal amine value (meq/kg)}=(A)-(B)$$

In an additional embodiment, the polyurethaneurea useful for preparing spandex may be described in terms of the weight percentage of NCO groups after the completion of the capping reaction. After the capping reaction is complete when all of the hydroxy (—OH) groups from the glycol molecules are consumed by the isocyanate (—NCO) groups from MDI to form a urethane bond, the weight percentage of the NCO groups, % NCO, left on the prepolymer can be determined. This experimentally determined % NCO should be matching the theoretically calculated % NCO result, determined by the capping ratio (CR), as the following:

$$\% \, NCO = \frac{8404 \times (CR-1)}{MW_{glycol} + CR \times MW_{mdi}}$$

In one embodiment of the present invention, the preferred % NCO range of the prepolymer is 2.60 to 3.80.

The number average molecular weight of the polyurethaneurea polymer used in the present invention, from the perspective of obtaining a fiber with high recoverability and strength, is preferably within the range between 40000 and 150000 for the number average molecular weight. Moreover, the molecular weight is measured by GPC and calculated based on polystyrene standards.

Examples of ultraviolet absorbing agents, antioxidants, and gas resistant stabilizers that can be contained in the polyurethane elastic fiber include, hindered phenol medicinal agents such as BHT and Sumitomo Chemical's "Sumilizer" GA-80, various benzotriazole series medicinal agents such as "Tinuvin", phosphorus medicinal agents such as Sumitomo Chemical's "Sumilizer" P-16, various hindered amine medicinal agents such as "Tinuvin", an inorganic pigment such as zinc oxide, titanium oxide, or carbon black, a metallic soap such as magnesium stearate, and an anti bacterial that contains silver, zinc, or a compound of these, a deodorizer, a lubricant such as silicon or mineral oil or the like, various antistatic agents such as barium sulfate, cerium oxide, betaine, and phosphates. In order to further increase resistance to especially light and various nitric oxides, nitric oxide scavengers such as HN-150 made by Japan Hydrazine, Inc., thermal oxidative stabilizers such as Sumitomo Chemical's "Sumilizer" GA-80, light stabilizers such as Sumitomo Chemical's "Sumilizer" 300 #622, and the like, can be used.

These agents may be added to the polyurethane solution until spinning, and the adding or blending method thereof can be selected at discretion. As a representative method, blending by a static mixer after adding to the spinning solution, or a stirring method, are preferably used. The additives are preferably added to the solution at this point. The use of a solution enables the additives to be added evenly into the polyurethane solution.

The spinning method at the time of forming the polyurethane elastic fiber by spinning polyurethane obtained by the solution polymerization method is not particularly restricted, and known methods such as dry spinning and wet spinning can be suitably used. However, dry spinning is preferred when considering productivity from the perspective that stable spinning is possible for all degrees of fineness from thin to thick yarn.

The fineness of the polyurethane elastic yarn of the present invention is not particularly restricted to a cross-sectional shape or the like. For example, a cross-sectional shape of the yarn may be circular or it may be flat.

In addition, the dry spinning method is not particularly restricted, and spinning may be performed by appropriately selecting spinning conditions and so forth that match the spinning equipment and desired properties.

For example, because the residual strain and initial stress of the polyurethane elastic fiber are particularly susceptible to the speed ratio of the Godet roller to winder, the properties are preferably determined appropriately according to the target use of the yarn, and generally, the speed ratio of the Godet roller to winder is preferably winding within a range of 1.1 and 1.8. Moreover, when considering improving the strength of the obtained polyurethane elastic fiber, a spinning rate of at least 250 m/min is preferred.

The fabric of the present invention is configured by using polyurethane elastic fibers as described above. The fabric may be configured from only the polyurethane elastic fibers, but the effect of the present invention can be achieved even in combination elastic fabric in which, for example, polyester yarn or nylon yarn or the like is combined therewith.

In other words, material made by combining the polyurethane elastic fibers with polyester yarn or nylon yarn will be able to achieve a compression fit with a fineness of 33 dtex or 22 dtex in the polyurethane elastic fibers described in the present invention that was previously not possible to achieve with use of the 44 dtex yarn fineness in the conventional polyurethane elastic fibers thereby enabling a comfortable compression and fit with thinner and lighter material which improves the fit of clothing because thinning and lightening of the fabric is possible.

In addition, the fabric may also be used for knit and woven fabrics. It may be used for knit fabrics with warp knit, weft knit or circular knit, and it may be used in any woven structure such as plain fabric, twill weave, or the like.

EXAMPLES

The present invention will be described in detail using the following examples. However, the present invention is not restricted by these embodiments.

Measurement of the Active Force and Recoverability of the Polyurethane Elastic Fiber The polyurethane elastic fiber was measured by using an Instron 550 tensile strength testing machine to get the active force and recoverability of the polyurethane elastic fiber.

A 5 cm length of test material was stretched 200% at a tensile strength of 50 cm/min and repeated 5 times. The active force of the first time and the active force and recoverability of the fifth time were measured.

Creation and Evaluation of the Elastic Fabric

A 44 dtex polyurethane elastic fiber was elongated to three times its length and covered with a polyamide processed yarn (trademark "Kupe" made by Toray, Inc. 33 DTEX, 26 Filaments) at a twist rate of 800 T/m, to make a single covered yarn (SCY) with S-twists and Z-twists.

In addition, S-twist SCY is fed into a feed opening 1,3 of a Panst knitting machine (Lonati, 400 needle count) at 1.0 g knitting tension, and the Z-twist SCY is fed into a 2,4 opening to knit knitted fabric.

Next, dye processing of the knit fabric is performed as indicated below to obtain knitted tights.
(1) Preset: vacuum dried, 90° C.×10 min.
(2) Dye; 2.0 owf % of "Laneset" (registered trademark) Black B is used for the dye made by Chiba Specialty Chemicals, Inc. and processed for 60 min at 90° C. to dye black. Acetic acid and ammonium sulfate were implemented for pH adjustment at the time of dying.
(3) Finally, softening processing is performed and completed through set processing (Panst Setting Machine, Set: 115° C.×10 sec, dry; 120° C.×30 sec).

The stretch ability and support strength of the obtained knitted fabric underwent the following sensory evaluations.
Stretch Ability Evaluation Points 3: Excellent stretch ability
  2: Slightly lacking stretch ability
  1: Lacks stretch ability
Support Strength Evaluation Points: 3: Excellent support
  2: Slightly lacking support
  1: Lacks Support Example 1

A prepolymer is obtained by reacting 390 g of polytetramethylene ether glycol (PTMEG) with a molecular weight of 1000 with 151.12 g of 4,4'-diphenylmethane diisocyanate (MDI) in a nitrogen atmosphere in a nonsolvent state at 80° C. for 3 hours. The residual isocyanate group after the reaction was 3.33 wt %.

540 g of the obtained prepolymer is dissolved in 1166 g of DMAc, and the chain extender solution in which 132.48 g of 10 wt % ethylenediamine/DMAc solution is blended with 9.76 g of 10 wt % diethylamine/DMAc solution is added while stirring vigorously at 40° C. to obtain a viscosity adjusted polymer solution of 30 wt % concentration. The terminal group concentration derived by the diamine compound of this polymer solution was 24 meq/kg.

A polyurethane solution generated by reacting t-butyldiethanolamine with methylene-bis(4-cyclohexylisocyanate) is blended with a condensation polymer of p-creosol and divinyl benzene in a 2 to 1 weight ratio into this polyurethane polymer solution, then DMAc is added, to prepare a 30 wt % additive solution. 96 parts by weight of the polyurethane polymer solution is blended with 4 parts by weight of the additive solution to make the spinning concentrate solution. This is dry spun at a speed of 650 m/min with a speed ratio for the Godet roller to winding machine at 1.25 to obtain a 33 DTEX 4 filament yarn.

The properties of the obtained yarn are shown in Table 1, and the results of sensory evaluation for stretch ability and support strength for the obtained knit fabric are shown in Table 2.

TABLE 1

|  | Ex 1 | Ex 2 | Ex 3 | Ex 4 | Ex 5 | Ex 6 | Comp Ex 1 | Comp Ex 2 | Comp Ex 3 | Comp Ex 4 | Comp Ex 5 |
|---|---|---|---|---|---|---|---|---|---|---|---|
| PTMG molecular weight | 1000 | 1000 | 650 | 1400 | 1400 | 1200 | 1800 | 1800 | 1800 | 1800 | 1800 |
| Molecular weight ratio | 2.6 | 2.6 | 2.4 | 2.6 | 2.6 | 2.5 | 8.0 | 2.0 | 2.0 | 2.0 | 2.1 |
| Molecular weight distribution | 6.95 | 6.95 | 7.66 | 2.95 | 2.95 | 3.06 | 1.77 | 1.77 | 1.77 | 1.77 | 4.66 |
| Diamine terminal group concentration | 24 meq/kg | 24 meq/kg | 19.5 meq/kg | 31 meq/kg | 31 meq/kg | 26 meq/kg | 28 meq/kg | 28 meq/kg | 40 meq/kg | 40 meq/kg | 24 meq/kg |
| Polymer weight average molecular weight | 108000 | 108000 | 106000 | 118000 | 118000 | 120000 | 112000 | 112000 | 103000 | 103000 | 121000 |
| Fineness (DTEX) | 44 | 22 | 22 | 44 | 22 | 22 | 44 | 22 | 44 | 22 | 22 |
| 1 cycle 100% stress (cN) | 4.2 | 2.1 | 2.5 | 3.5 | 1.7 | 1.8 | 2.2 | 1.1 | 2.0 | 1.0 | 2.1 |
| 1 cycle 200% stress (cN) | 7.9 | 4.0 | 6.8 | 8.0 | 3.9 | 4.0 | 5.0 | 2.5 | 5.1 | 2.5 | 3.9 |
| 5 cycle 100% stress (cN) | 3.5 | 1.8 | 1.7 | 2.2 | 1.1 | 1.1 | 1.4 | 0.7 | 1.3 | 0.6 | 0.7 |
| 5 cycle 200% stress (cN) | 6.6 | 3.4 | 3.2 | 6.9 | 3.3 | 3.4 | 4.3 | 2.1 | 4.1 | 2.0 | 3.3 |
| 5 cycle 100% recovery (cN) | 1.5 | 0.8 | 0.8 | 1.6 | 0.8 | 0.8 | 1.0 | 0.5 | 0.9 | 0.4 | 0.5 |
| 5 cycle 200% recovery (cN) | 5.0 | 2.6 | 2.6 | 5.6 | 2.6 | 2.7 | 3.5 | 1.7 | 3.3 | 1.7 | 2.0 |
| Breaking elongation (%) | 430 | 430 | 390 | 460 | 450 | 440 | 470 | 470 | 440 | 435 | 410 |
| Breaking strength (cN/DTEX) | 0.9 | 0.9 | 0.7 | 1.0 | 1.0 | 1.0 | 1.0 | 1.0 | 0.9 | 0.9 | 0.7 |

TABLE 2

|  | Fineness (DTEX) | Stretch Ability Evaluation | Support Strength Evaluation | Overall Evaluation |
|---|---|---|---|---|
| Example 1 | 44 | 2.5 | 3.0 | 5.5 |
| Example 2 | 22 | 2.5 | 2.2 | 4.7 |
| Example 3 | 22 | 2.4 | 2.0 | 4.4 |
| Example 4 | 44 | 2.8 | 3.0 | 5.8 |
| Example 5 | 22 | 2.6 | 2.2 | 4.8 |
| Example 6 | 22 | 2.8 | 2.4 | 5.2 |
| Comparative Example 1 | 44 | 2.7 | 2.4 | 5.1 |
| Comparative Example 2 | 22 | 2.6 | 1.0 | 3.6 |
| Comparative Example 3 | 44 | 2.7 | 2.6 | 5.3 |
| Comparative Example 4 | 22 | 2.4 | 1.0 | 3.4 |
| Comparative Example 5 | 22 | 1.2 | 1.8 | 3.0 |

Example 2

With the exception of using PTMEG adjusted to a molecular weight of 1000 by blending 35 parts by weight of PTMEG with a molecular weight of 650 with 65 parts by weight of PTMEG with a molecular weight 1400, spinning was performed to prepare spinning concentrate solution by adding an additive solution to the polymerized polyurethane polymer solution under the same conditions as Example 1.

The properties of the obtained yarn are shown in Table 1, and the results of sensory evaluation for stretch ability and support strength for the knit fabric are shown in Table 2.

Example 3

A prepolymer is obtained by reacting 390 g of PTMEG with a molecular weight of 650 with 210 g of MDI in a nitrogen atmosphere in a nonsolvent state at 80° C. for 3 hours. The residual isocyanate group after the reaction was 3.36 wt %.

600 g of the obtained prepolymer is dissolved in 1294.78 g of DMAc, and the chain extender solution in which 149.04 g of 10 wt % ethylenediamine/DMAc solution is blended with 8.78 g of 10 wt % diethylamine/DMAc solution is added while stirring vigorously at 40° C. to obtain a viscosity adjusted polymer solution of 30 wt % concentration. The terminal group concentration derived by the diamine compound of this polymer solution was 19.5 meq/kg.

The additive solution was blended into the polyurethane polymer solution in the same manner as Example 1 to prepare a spinning concentrate solution and perform spinning. The properties of the obtained yarn are shown in Table 1, and the results of sensory evaluation for stretch ability and support strength for the knit fabric are shown in Table 2.

Example 4

A prepolymer is obtained by reacting 400 g of PTMEG with a molecular weight of 1400 with 121.42 g of MDI in a nitrogen atmosphere in a nonsolvent state at 80° C. for 3 hours. The residual isocyanate group after the reaction was 3.22 wt %.

520 g of the obtained prepolymer is dissolved in 1122.66 g of DMAc, and the chain extender solution in which 123.86 g of 10 wt % ethylenediamine/DMAc solution is blended with 12.16 g of 10 wt % diethylamine/DMAc solution is added while stirring vigorously at 40° C. to obtain a viscosity adjusted polymer solution of 30 wt % concentration. The terminal group concentration derived by the diamine compound of this polymer solution was 31 meq/kg.

The additive solution was blended into the polyurethane polymer solution in the same manner as Example 1 to prepare a spinning concentrate solution and perform spinning. The properties of the obtained yarn are shown in Table 1, and the results of sensory evaluation for stretch ability and support strength for the knit fabric are shown in Table 2.

Example 5

With the exception of using PTMEG adjusted to a molecular weight of 1400 by blending 50 parts by weight of PTMEG with a molecular weight of 1000 with 50 parts by weight of PTMG with a molecular weight 1800, spinning was performed to prepare spinning concentrate solution by adding an additive solution to the polymerized polyurethane polymer solution under the same conditions as Example 4.

The properties of the obtained yarn are shown in Table 1, and the results of sensory evaluation for stretch ability and support strength for the knit fabric are shown in Table 2.

Example 6

A prepolymer is obtained by reacting 400 g of PTMEG adjusted to a molecular weight of 1200 by blending 62.5 parts by weight of PTMEG with a molecular weight of 1000 with 37.5 parts by weight PTMEG with a molecular weight of 1800, with 137.50 g of MDI in a nitrogen atmosphere in a nonsolvent state at 80° C. for 3 hours. The residual isocyanate group after the reaction was 3.38 wt %.

535 g of the obtained prepolymer is dissolved in 1152.04 g of DMAc, and the chain extender solution in which 133.92 g of 10 wt % ethylenediamine/DMAc solution is blended with 10.52 g of 10 wt % diethylamine/DMAc solution is added while stirring vigorously at 40° C. to obtain a viscosity adjusted polymer solution of 30 wt % concentration. The terminal group concentration derived by the diamine compound of this polymer solution was 26 meq/kg.

The additive solution was blended into the polyurethane polymer solution in the same manner as Example 1 to prepare a spinning concentrate solution and perform spinning. The properties of the obtained yarn are shown in Table 1, and the results of sensory evaluation for stretch ability and support strength for the knit fabric are shown in Table 2.

Comparative Example 1

A prepolymer is obtained by reacting 400 g of PTMEG with a molecular weight of 1800 with 87.78 g of MDI in a nitrogen atmosphere in a nonsolvent state at 90° C. for 2 hours. The residual isocyanate group after the reaction was 2.22 wt %.

485 g of the obtained prepolymer is dissolved in 1071.67 g of DMAc, and the chain extender solution in which 79.58 g of 10 wt % ethylenediamine/DMAc solution is blended with 10.41 g of 10 wt % diethylamine/DMAc solution is added while stirring vigorously at 40° C. to obtain a viscosity adjusted polymer solution of 30 wt % concentration. The terminal group concentration derived by the diamine compound of this polymer solution was 28 meq/kg.

The additive solution was blended into the polyurethane polymer solution in the same manner as Example 1 to prepare a spinning concentrate solution and perform spinning. The properties of the obtained yarn are shown in Table 1, and the results of sensory evaluation for stretch ability and support strength for the knit fabric are shown in Table 2.

Comparative Example 2

A prepolymer is obtained by reacting 400 g of PTMEG with a molecular weight of 1800 with 105.56 g of MDI in a nitrogen atmosphere in a nonsolvent state at 90° C. for 2 hours. The residual isocyanate group after the reaction was 3.32 wt %.

505 g of the obtained prepolymer is dissolved in 1084.80 g of DMAc, and the chain extender solution in which 124.06 g of 10 wt % ethylenediamine/DMAc solution is blended with 16.24 g of 10 wt % diethylamine/DMAc solution is added while stirring vigorously at 40° C. to obtain a viscosity adjusted polymer solution of 30 wt % concentration. The terminal group concentration derived by the diamine compound of this polymer solution was 40 meq/kg.

The additive solution was blended into the polyurethane polymer solution in the same manner as Example 1 to prepare a spinning concentrate solution and perform spinning. The properties of the obtained yarn are shown in Table 1, and the results of sensory evaluation for stretch ability and support strength for the knit fabric are shown in Table 2.

For Examples 7-19 the following test methods were used:

The NCO content of the capped glycols was determined according to the method of S. Siggia, "Quantitative Organic Analysis via Functional Group", 3rd Edition, Wiley & Sons, New York, pages 559-561 (1963).

The strength and elastic properties of the spandex fibers were measured in accordance with the general method of ASTM D 2731-72. Three threads, a 2-inch (5-cm) gauge length and a 0-300% elongation cycle were used for each of the measurements. The samples were cycled five times at a constant elongation rate of 50 centimeters per minute. Load power (TP2), the stress on the spandex during initial extension, was measured on the first cycle at 200% extension and is reported as grams/denier. Unload power (TM2) is the stress at an extension of 200% for the fifth unload cycle and is also reported in grams/denier. Percent elongation at break (ELO) and tenacity (TEN) were measured on a sixth extension cycle. Percent set was also measured on samples that had been subjected to five 0-300% elongation/relaxation cycles. The percent set, % Set, was then calculated as $$\% \text{ Set}=100(L_f-L_o)/L_o,$$

where Lo and Lf are respectively the filament (yarn) length when held straight without tension before and after the five elongation/relaxation cycles.

Additionally, instead of 0-300% stretch cycles, the spandex threads of 140 denier were stretched and cycled to a fixed tension, e.g., 15 grams of force. The stress-strain properties including load power, unload power and % Set were measured and recorded.

Alternatively, the tensile properties of the spandex fibers were measured in the first cycle to the breaking point using an Instron tensile tester equipped with a Textechno grip. The load power at 200% stretch (TT2), breaking elongation (TEL) and breaking tenacity (TTN) were recorded.

Example 7

To a 2000 ml Pyrex® glass reaction kettle, which was equipped with an air pressure driven stirrer, a heating mantle and a thermocouple temperature measurement, was charged 250.0 grams of Terathane® 1000 glycol (commercially available from Invista, S. à. r. L., of Wichita, Kans. and Wilmington, Del.) and 93.88 grams of molten Isonate 125MDR (commercially available from the Dow Company, Midland, Mich.). The reaction mixture was stirred and heated to 90° C. in a glove box with nitrogen atmosphere, and was held at this temperature for 120 minutes with continuous stirring to complete the reaction for the formation of the prepolymer. The NCO content, or % NCO, of the capped glycol prepolymer was determined to be 2.962. To the viscous prepolymer, 628.91 grams of N,N-dimethylacetamide (DMAc) was added with vigorous stirring. Once the prepolymer was fully dissolved in the solvent, a mixture of 123.35 grams of the chain extender solution (containing ethylenediamine and 2-methyl-1,5-pentanediamine at the mole ratio of 90 to 10) and 4.75 grams of the chain terminator solution (containing diethylamine), both at the concentration of 2.0 miliequivalent per gram of DMAc solution, was added into the diluted and dissolved prepolymer solution within 10 seconds with stirring. The resulted viscous polymer solution was allowed to mix for another 15 minutes through continued stirring, and was then stored in a Nalgene® plastic bottle for spinning into fibers.

Example 8

Same procedures and ingredients as Example 7 were used to prepare Example 8 polymer solution, except for the changes in ingredient quantities and the determined % NCO of the prepolymer as shown below:

| | |
|---|---|
| Terathane ® 1000 | 250.00 grams |
| Isonate 125MDR | 100.12 grams |
| Determined % NCO | 3.505% |
| DMAc | 622.13 grams |
| Extender solution | 148.32 grams |
| Terminator solution | 5.04 grams |

Example 9

Same procedures and ingredients as Example 7 were used to prepare Example 9 polymer solution, except for the changes in ingredient quantities and the determined % NCO of the prepolymer as shown below:

| | |
|---|---|
| Terathane ® 1000 | 250.00 grams |
| Isonate 125MDR | 96.99 grams |
| Determined % NCO | 3.235% |
| DMAc | 625.17 grams |
| Extender solution | 135.73 grams |
| Terminator solution | 5.35 grams |

Example 10

Same procedures and ingredients as Example 7 were used to prepare Example 10 polymer solution, except for the changes in ingredient quantities and the determined % NCO of the prepolymer as shown below:

| | |
|---|---|
| Terathane ® 1000 | 250.00 grams |
| Isonate 125MDR | 90.73 grams |
| Determined % NCO | 2.665% |
| DMAc | 632.51 grams |
| Extender solution | 110.82 grams |
| Terminator solution | 4.35 grams |

Example 11

Same procedures and ingredients as Example 7 were used to prepare Example 11 polymer solution, except that Terathane®650 glycol (commercially available from Invista, S. à. r. L., of Wichita, Kans. and Wilmington, Del.) was used instead of Terathane®1000. Accordingly, changes in ingredient quantities and the determined % NCO of the prepolymer were also made as shown below:

| | |
|---|---|
| Terathane ® 650 | 250.00 grams |
| Isonate 125MDR | 130.22 grams |
| Determined % NCO | 2.818% |
| DMAc | 697.78 grams |
| Extender solution | 133.78 grams |
| Terminator solution | 4.87 grams |

Example 12

Same procedures and ingredients as Example 11 were used to prepare Example 12 polymer solution, except that the ingredient quantities and the determined % NCO of the prepolymer were changed as showed below:

| | |
|---|---|
| Terathane ® 650 | 250.00 grams |
| Isonate 125MDR | 135.26 grams |
| Determined % NCO | 3.201% |
| DMAc | 691.60 grams |
| Extender solution | 153.89 grams |
| Terminator solution | 5.93 grams |

Example 13

Same procedures and ingredients as Example 11 were used to prepare Example 13 polymer solution, except that the chain extender solution, still at the concentration of 2.0 miliequvalent per gram, was made up with a mixture of ethylenedaimine and 2-methyl-1,5-pentanediamine at the mole ratio of 80 to 20. Changes in ingredient quantities and the determined % NCO of the prepolymer were also made as shown below:

| | |
|---|---|
| Terathane ® 650 | 250.00 grams |
| Isonate 125MDR | 135.26 grams |
| Determined % NCO | 3.316% |
| DMAc | 700.15 grams |
| Extender solution | 133.78 grams |
| Terminator solution | 4.87 grams |

Example 14

Same procedures and ingredients as Example 7 were used to prepare Example 8 polymer solution, except that the ingredient quantities and the determined % NCO of the prepolymer were changed as showed below:

| | |
|---|---|
| Terathane ® 650 | 250.00 grams |
| Isonate 125MDR | 140.44 grams |
| Determined % NCO | 3.585% |
| DMAc | 688.33 grams |
| Extender solution | 174.53 grams |
| Terminator solution | 7.05 grams |

Example 15

Same procedures and ingredients as Example 11 were used to prepare Example 15 polymer solution, except that the chain extender solution, still at the concentration of 2.0 miliequvalent per gram, was made up with ethylenediamine only in DMAc. Changes in ingredient quantities and the determined % NCO of the prepolymer were also made as shown below:

| | |
|---|---|
| Terathane ® 650 | 250.00 grams |
| Isonate 125MDR | 125.33 grams |
| Determined % NCO | 2.603% |
| DMAc | 669.81 grams |
| Extender solution | 114.20 grams |
| Terminator solution | 6.129 grams |

Example 16

Same procedures and ingredients as Example 15 were used to prepare Example 16 polymer solution, except that the ingredient quantities and the determined % NCO of the prepolymer were changed as showed below:

| | |
|---|---|
| Terathane ® 650 | 250.00 grams |
| Isonate 125MDR | 130.22 grams |
| Determined % NCO | 2.845% |
| DMAc | 693.59 grams |
| Extender solution | 133.78 grams |
| Terminator solution | 6.99 grams |

Comparative Example 3

Same procedures and ingredients as Example 7 were used to prepare the Comparative Example 3 polymer solution, except that Terathane®1800 glycol (commercially available from Invista, S. à. r. L., of Wichita, Kans. and Wilmington, Del.) was used instead of Terathane®1000. Accordingly, changes in ingredient quantities and the determined % NCO of the prepolymer were also made as shown below:

| | |
|---|---|
| Terathane ® 1800 | 250.00 grams |
| Isonate 125MDR | 58.68 grams |
| Determined % NCO | 2.614% |
| DMAc | 578.12 grams |
| Extender solution | 93.93 grams |
| Terminator solution | 3.94 grams |

The above polymer solutions made in the laboratory were spun into 40-denier, 3-filament yarns through a drying spinning process. The DMAc solvent was removed with heated nitrogen gas of 400° C. flushing through the spinning cell at a rate of 15 lbs/hr. The cell wall temperatures were controlled between 290 and 210° C. in multiple heating zones. The dried yarn was applied with a lubricating finish and wound up on a tube at the bottom of the spinning cell at the speed of 667 yards per minute (ypm). The tensile properties of the as-spun yarn, after 24 hours ageing on the tube at room temperatures, were measured and given in Table 3 below.

TABLE 3

| EXAM-PLES | TP2 (gpd) | TM2 (gpd) | ELO (%) | TEN (gpd) | Set (%) | TT2 (g) | TEL (%) | TTN (g) |
|---|---|---|---|---|---|---|---|---|
| Comparative 3 | 0.1027 | 0.0261 | 578 | 1.139 | 25.50 | 5.41 | 517 | 55.65 |
| Example 7 | 0.1462 | 0.0372 | 476 | 1.275 | 36.85 | 7.21 | 418 | 61.34 |
| Example 8 | 0.1693 | 0.0367 | 453 | 1.001 | 43.10 | 9.64 | 336 | 37.91 |
| Example 9 | 0.1488 | 0.0360 | 486 | 1.126 | 42.56 | 7.71 | 397 | 49.28 |
| Example 10 | 0.1412 | 0.0392 | 450 | 1.192 | 32.93 | 6.70 | 424 | 71.68 |
| Example 11 | 0.3398 | 0.0359 | 349 | 1.127 | 40.52 | 15.15 | 325 | 63.33 |
| Example 12 | 0.4092 | 0.0385 | 354 | 1.330 | 44.81 | 20.24 | 292 | 61.73 |
| Example 13 | 0.3492 | 0.0346 | 346 | 0.949 | 45.55 | 20.12 | 316 | 71.85 |
| Example 14 | 0.4752 | 0.0307 | 339 | 0.908 | 51.21 | 24.08 | 292 | 63.43 |
| Example 15 | 0.2743 | 0.0427 | 356 | 1.103 | 42.70 | 11.75 | 340 | 63.96 |
| Example 16 | 0.2595 | 0.0395 | 372 | 1.075 | 45.81 | 13.51 | 342 | 62.28 |

It can be seen that the examples 7-16 of the present invention exhibit significantly higher modulus (load power TP2 and TT2) and higher recovery power (unload power TM2) than the comparative example 3.

Example 17

The polymer solution was made in the same way as Example 9, and it was spun into 140-denier, 10-filament yarn. The heated nitrogen gas delivered to the spinning cell was at 400° C. with a flow rate of 20 lbs/hr. The cell wall temperatures were controlled between 290 and 210° C. in multiple heating zones. The dried yarn was applied with a lubricating finish and wound up on a tube at the bottom of the spinning cell at the speed of 667 yards per minute (ypm).

Example 18

The polymer solution was made in the same way as Example 11, and it was spun into 140-denier, 10-filament yarn using the same spinning conditions as Example 17 except that the wound-up speed was at 600 yards per minute (ypm).

Example 19

The polymer solution was made in the same way as Example 12, and it was spun into 140-denier, 10-filament yarn using the same spinning conditions as Example 18.

Comparative Example 4

The polymer solution was obtained from the commercial production in making LYCRA® T162C spandex fibers, and it was spun into 140-denier, 10-filament yarn using the same spinning conditions as Example 17.

Comparative Example 5

The polymer solution was obtained from the commercial production in making LYCRA® T127 spandex fibers, and it was spun into 140-denier, 10-filament yarn using the same spinning conditions as Example 17.

The tensile properties of the as-spun 140-denier yarn, after 24 hours ageing on the tube at room temperatures, were measured and given in Table 4.

TABLE 4

| EXAMPLES | TP2 (gpd) | TM2 (gpd) | ELO (%) | TEN (gpd) | Set (%) |
| --- | --- | --- | --- | --- | --- |
| Comparative 4 | 13.96 | 3.53 | 525 | 120.9 | 22.18 |
| Comparative 5 | 12.66 | 3.31 | 547 | 104.8 | 24.15 |
| Example 17 | 18.01 | 4.35 | 433 | 90.8 | 42.13 |
| Example 18 | 28.12 | 4.64 | 333 | 88.1 | 39.02 |
| Example 19 | 29.57 | 4.73 | 371 | 110.8 | 47.19 |

It can be seen from Table 4 that the examples 17-19 from the present invention have substantially higher modulus (or load power TP2) and higher recovery power (or unload power TM2) in comparison to incumbent commercial products (comparative 4 and 5).

What is claimed is:

1. An elastic fabric comprising a polyurethane elastic fiber made of a polyether based polyol with a minimum number average molecular weight of about 450 and a maximum of about 1600, an organic diisocyanate compound, and a diamine compound, wherein the reaction equivalent ratio (molar ratio or capping ratio) of the organic diisocyanate compound to the polyol is in the range of 1.3:1 to 1.7:1.

2. The elastic fabric according to claim 1, wherein the ratio of the weight average molecular weight to the number average molecular weight of the polyol is a minimum of 1.8:1.

3. The elastic fabric according to claim 1, wherein a polyol of low molecular weight is blended with a polyol of high molecular weight.

4. The elastic fabric according to claim 1, wherein the reaction equivalent ratio (molar ratio or capping ratio) of the organic diisocyanate compound to the polyol is in the range of 1.4:1 to 1.6:1.

5. The elastic fabric according to claim 1, wherein the polyurethane elastic fiber is spun from a solution-polymerized polyurethane polymer solution by the prepolymer method.

6. The elastic fabric according to claim 1, wherein the polyurethane polymer is derived from a diamine compound and has a terminal group concentration of 5 to 50 meq/kg.

7. The elastic fabric according to claim 1, wherein the number average molecular weight of the polyurethane polymer is between 40000 to 150000 calculated with polystyrene as the standard.

8. The elastic fabric according to claim 1, wherein the polyurethane elastic fiber is spun by dry spinning the polyurethane polymer solution.

9. The fabric according to claim 1 wherein the polyurethane has a % NCO range of the prepolymer of 2.6 to 3.8.

* * * * *